Patented Oct. 25, 1949

2,485,631

UNITED STATES PATENT OFFICE 2,485,631

SOYBEAN OIL COMPOSITION AND METHOD OF PREPARING SAME

Ralph H. Neal, Jersey City, N. J., Chester M. Gooding, Staten Island, N. Y., and Hans W. Vahlteich, Edgewater, N. J., assignors to The Best Foods, Inc., New York, N. Y., a corporation of New Jersey No Drawing. Application July 31, 1945, Serial No. 608,101

11 Claims. (Cl. 260—398.5)

This invention relates to soya bean oil compositions, and more particularly to soya bean oil compositions possessing marked resistance to deterioration.

An object of this invention is to retard the deterioration of soya bean oil.

Another object of this invention is to retard for relatively prolonged periods the development of rancidity of soya bean oil.

Another object of this invention is to incorporate agents in soya bean oil, which agents markedly retard deterioration of soya bean oil, but due to their insolubility or immiscibility per se in soya bean oil, are difficult to incorporate therein.

Another object of this invention is to retard the development of off-flavor or flavor reversion in deodorized soya bean oil.

It is well recognized that natural oils and fats develop rancidity particularly in the presence of moisture. This rancidity renders their use, especially for edible products, undesirable and, in some cases, entirely unsatisfactory. Various materials have been heretofore proposed for retarding this development of rancidity in natural oils and fats, but frequently these materials are substantially incompatible with oils and fats, and in some cases their efficacy is questionable.

In deodorized soya bean oil, there sometimes develops an off-flavor which is ordinarily called flavor reversion. This off-flavor has been characterized as grassy, beany, painty or fishy and is somewhat analogous to the original unpalatable taste and odor of the crude oil. This development of off-flavor appears to be different from the rancidity of the oil and is usually discernible before the rancidity becomes manifest quantitatively.

In accordance with this invention, compositions comprising principally soya bean oil or a mixture of oils containing soya bean oil are produced which do not develop rancidity over a relatively long period. These compositions comprise the soya bean oil and monoisopropyl citrate. In some cases, the monoisopropyl citrate is not soluble or miscible to a sufficient degree in the soya bean oil to produce a substantially homogeneous composition. To disperse the monoisopropyl citrate throughout the soya bean oil, an oil-soluble hydrophilic coupling agent is employed. Examples of satisfactory oil-soluble hydrophilic coupling agents for this purpose are the diesters and triesters of citric acid, oil-soluble aliphatic alcohols having at least 6 carbon atoms, monocarboxylic acids having at least 10 carbon atoms and monoglycerides of monocarboxylic acids in which the acyl group has at least 10 carbon atoms. When an oil-soluble hydrophilic coupling agent is employed, the monoisopropyl citrate is first dissolved in the oil-soluble hydrophilic coupling agent, and the resulting mixture is incorporated in the soya bean oil. The diesters and triesters of citric acid have been found very satisfactory for solubilizing the monoester of citric acid. The incorporation in soya bean oil, and particularly in refined, hydrogenated and deodorized soya bean oil, of a mixture of monoisopropyl citrate and diesters of citric acid or a mixture of monoisopropyl citrate and di- and triesters of citric acid, has been found effective for preventing the development of the off-flavor.

The compositions of this invention may be a substantially all oil system, such as shortening, or an aqueous and oil system, such as margarine. In the aqueous and oil system, the nicety of balance between the hydrophilic components and lipophilic components may be achieved by regulating the proportions of the monoisopropyl citrate and the hydrophilic coupling agent added to soya bean oil. In the all oil system, by adding a sufficient quantity such as 0.1 to 10% of monoisopropyl citrate and a suitable quantity of the hydrophilic coupling agent, a shortening, for example, is obtained which, when utilized as a component in baking, has a high lift characteristic, permits a high ratio of sugar to flour and produces a resulting baked product which is substantially homogeneous and has a fine texture. In addition, such shortening markedly facilitates the mixing of the aqueous phase of the batter, such as milk, and the resulting batter is materially less viscous than batter prepared from low ratio shortening. Monoisopropyl citrate alone or in combination with a hydrophilic coupling agent such as monoglycerides of monocarboxylic acid or a mixture of di- and tri-esters of citric acid or both have been found to have marked emulsified characteristics.

The ability of the compositions of this invention to withstand deterioration resulting from oxidation is best demonstrated by a comparative testing under identical conditions by the active oxygen test, also called the Swift stability test. In this comparative testing, hydrogenated and deodorized vegetable oil containing between 35 to 40% of hydrogenated and deodorized soya bean oil together with hydrogenated and deodorized cottonseed and peanut oils and having an iodine number (Wijs) from 73 to 75, was subjected to aeration at a temperature of about 100° C. for a period of hours until the rancid point was reached in accordance with the method described in Oil and Soap (vol. X, No. 6, pp. 105-9, June, 1933). Samples of the same oil to which was added monoisopropyl citrate and two other samples, to one of which diisopropyl citrate was added and to the other of which triisopropyl citrate was added, were tested under identical conditions. The results of this testing were as follows:

| Identity of Sample | Percent by weight of ester in the oil tested | Wiley M. P. of treated oil °F. | Setting point of oil °C. | Active oxygen test value. Hours to rancid point [1] |
|---|---|---|---|---|
| Oil+monoisopropyl | 0.036 | 91.9° | 25.4° | 95 |
| Do | 0.018 | 91.9° | 25.1° | 98 |
| Oil+diisopropyl citrate | 0.04 | 91.9° | 25.2° | 64 |
| Do | 0.04 | 92.1° | 25.4° | 64 |
| Oil+triisopropyl citrate | 0.05 | 91.4° | 25.5° | 63 |
| Control-oil without any addition | None | 91.9° | 25.2° | 54 |

[1] 100-peroxide number-milliequivalents per kilogram.

It is observed that the addition of diisopropyl citrate did not materially affect the development of rancidity. Likewise, the addition of triisopropyl citrate produced substantially the same effect as the diisopropyl citrate, while the monoisopropyl citrate materially increased the ability of the oil to withstand oxidation under the conditions of the test.

Another series of tests showing the comparative efficacy of the monoisopropyl citrate and diisopropyl citrate again illustrates the marked effect that the monoisopropyl citrate has on the prevention of rancidity. In this testing, a hydrogenated and deodorized vegetable oil containing 35 to 40% of soya bean oil, together with hydrogenated and deodorized cottonseed and peanut oils and having an iodine number (Wijs) from 73 to 75 was subjected to aeration under a relatively high temperature as described in Oil and Soap, supra. Other samples containing various amounts of monoisopropyl citrate and diisopropyl citrate were tested under identical conditions. The results of these testings are given in the following table:

| Sample | Concentration (Wt. % of ester in oil tested) | Active Oxygen test value, Hours to Rancid Point [1] |
|---|---|---|
| Oil (without any addition) | None | 54 |
| Oil+Monoisopropyl citrate | 0.0125 | 85 |
|  | 0.0063 | 80 |
|  | 0.0032 | 81 |
|  | 0.0016 | 79 |
| Oil+Diisopropyl citrate | 0.0125 | 54 |
|  | 0.0063 | 54 |
|  | 0.0032 | 55 |
|  | 0.0016 | 55 |

[1] 100 Peroxide number-milliequivalents per kilogram.

An examination of this table reveals that even a minute quantity of monoisopropyl citrate retards substantially the development of rancidity in the oil. For example, .0016% by weight of monoisopropyl citrate increases the active oxygen value nearly 50%. On the other hand, regardless of the amount added diisopropyl citrate did not materially retard the development of rancidity under the conditions of test.

The addition of monoisopropyl citrate retards the development of rancidity due to oxidation in all types of soya bean oil although the most pronounced effect is observed with hydrogenated and deodorized margarine and shortening oils.

Although the values given in the data outlined in the above tables are believed to be typical and representative of soya bean oils, variations will appear among soya bean oils, particularly those derived from different origins. In some of these oils the improvement by the addition of monoisopropyl citrate is more marked than in others. A particular improvement is found in soya bean oil hydrogenated to a degree required for use as a component of margarine or shortening. However, all soya bean oils are improved to at least some degree.

The prevention of rancidity as manifest by the values obtained in active oxygen tests is applicable to soya bean oil or mixtures of soya bean oil with other vegetable oils such as cottonseed oil and peanut oil as heretofore shown. For example, in the production of margarine, soya bean oil is sometimes employed in significant amounts such as from about 25 to 75% in a blend of oils for this purpose. The addition of the monoisopropyl citrate to such mixtures of vegetable oils has been found to retard the development of rancidity of the oils particularly after they have been hydrogenated and deodorized. Monoisopropyl citrate is soluble only to a limited degree in soya bean oil or mixtures containing soya bean oil. While the oil may be heated to dissolve some of the monoisopropyl citrate, such heating, particularly if a high temperature is required, materially damages the oil for some purposes. To facilitate the uniform dispersion of the monoisopropyl citrate throughout the body of the oil, an oil-soluble coupling agent is employed. The monoisopropyl citrate is dissolved in the coupling agent and the resulting solution mixed, desirably with agitation, throughout the body of the oil. Among the coupling agents that are satisfactory for this purpose are monoacyl glycerides, preferably monoacyl glycerides, in which the acyl radical has at least 10 carbon atoms, saturated monohydric alcohols, preferably saturated monohydric alcohols having at least 6 carbon atoms, fatty acids having at least 10 carbon atoms, diesters of citric acid such as dialiphatic esters of citric acid, for example, dialkyl citrates in which the alkyl group has at least 10 carbon atoms and triesters of citric acid such as trialiphatic esters of citric acid, for example, trialkyl citrate in which the alkyl group has at least 10 carbon atoms.

Examples of monoacyl glycerides which may be employed as coupling agents are the monostearyl glycerides, monooleyl glycerides, monolauryl glycerides and monopalmityl glycerides or mixtures thereof. These monoacyl glycerides as commercially prepared contain substantial amounts of the corresponding diacyl glycerides and traces of the corresponding triacyl glycerides. Such monoacyl glycerides as commercially prepared may be employed as the coupling agents in the compositions of this invention.

Examples of saturated monohydric alcohols which may be employed as coupling agents are 2-ethylhexyl alcohol, n-octyl alcohol, stearyl alcohol, cetyl alcohol and myristyl alcohol.

Examples of the fatty acids which may be employed for solubilizing agents are stearic acid, palmitic acid, oleic acid, lauric acid and myristic acid.

Examples of the dialiphatic esters of citric acid such as dialkyl esters of citric acid and dialkylene esters of citric acid, which may be employed as solubilizing or coupling agents for the monoisopropyl citrate are diethyl citrate, di-n-propyl citrate, diisopropyl citrate, di(n-butyl) citrate, dicrotyl citrate, diisobutyl citrate, diisoamyl citrate, di-(2-ethylhexyl) citrate, dilauryl citrate, dimyristyl citrate, dipalmityl citrate, dioleyl citrate and distearyl citrate. Examples of the trialiphatic esters of citric acid, such as dialkyl and dialkylene esters of citric acid, which may be employed as coupling agents are those corresponding to the dialiphatic esters of citric acid heretofore specifically noted.

Mixtures of monoisopropyl citrate and other monoaliphatic esters of citric acid may be employed in the composition of this invention. For example, a mixture of monoisopropyl citrate and other monoalkyl esters of citric acid may be added to the soya bean oil, or again, monoisopropyl citrate and other monoalkylene monoesters of citric acid may be added to the soya bean oil; or a mixture of monoisopropyl citrate and a monoalkyl ester and a monoalkylene ester may be employed. Likewise, mixtures of dialiphatic esters of citric acid or the trialiphatic esters of citric acid may be utilized as solubilizing agents. In fact, it has been found convenient in the utilization of the monoisopropyl citrate in a specific embodiment of this invention to produce the solubilizing agent simultaneously with the monoisopropyl citrate. This end can be conveniently achieved by reacting an appropriate amount of citric acid with isopropyl alcohol to produce the required amount of monoisopropyl citrate together with sufficient amounts of the corresponding di- and/or triisopropyl citrate to effect solubilizing of the monoesters in the soya bean oil.

Again mixtures of various solubilizing agents may be utilized to effect uniform dispersion of monoisopropyl citrate throughout the soya bean oil. For example, a mixture of lauryl alcohol, cetyl alcohol, distearyl citrate and tristearyl citrate may be employed to effect the solubilizing of monoisopropyl citrate in the soya bean oil. Alternately, a mixture of different monoacyl glycerides may be utilized for the solubilizing.

A more comprehensive understanding of this invention is obtained by reference to the following examples:

*Example 1.*—One gram of monoisopropyl citrate is dissolved in 5 grams of monoacyl glycerides prepared from a commercial vegetable oil containing about 60% of hydrogenated and deodorized soya bean oil and the remainder hydrogenated and deodorized cottonseed oil. The monoglycerides are prepared from this vegetable oil by reacting glycerine with the vegetable oil in the presence of sodium bicarbonate. The amount of oil and glycerine added are such as to produce predominantly the monoacyl derivatives of the fatty acid components of the vegetable oil. The solution of the monoisopropyl citrate is added at a temperature of about 40–50° C. to 10 kilograms of a hydrogenated and deodorized vegetable oil suitable for use in the production of margarine and containing about 60% of hydrogenated and deodorized soya bean oil and the remainder hydrogenated and deodorized cottonseed oil. The soya bean oil prior to the addition of the solution of the monoisopropyl citrate is heated to a temperature of 40–50° C. to insure its being in a liquid condition during the addition. The mixture is then agitated to disperse uniformly the monoisopropyl citrate throughout the soya bean oil.

The monoisopropyl citrate is a new compound and is prepared as follows:

Equal parts of USP citric acid and anhydrous isopropyl alcohol are heated together under reflux, without catalyst for 118 hours at 92° C., after which time the acid value of the reaction mixture is found to be about 203.6 and the saponification value 392 (one-half esterified). The alcohol and most of the water of reaction is removed by low temperature evaporation in vacuo.

The residue is taken up with ethyl ether and then thrown out of the ether solution by the addition of a quantity of low-boiling petroleum ether just sufficient to form a precipitate. The precipitate or oily residue is again taken up with ethyl ether and the precipitation with low boiling petroleum ether repeated. This procedure is repeated several times. After final removal of solvent by heating with stirring to 130° C. a typical analysis is:

|  | Found | Calc'd |
|---|---|---|
| Acid Value | 454 | 480 |
| Saponification Value | 709 | 720 |

This product solidifies after long standing and consists of a mixture of about 90% monoester and 10% diester. The resulting product, without further purification, may be used in the soya bean composition heretofore described.

*Example 2.*—A composition comprising hydrogenated and deodorized soya bean oil in which is incorporated monoisopropyl citrate together with diisopropyl citrate and triisopropyl citrate and the monoglycerides of the fatty acid components of substantially any vegetable oil, but conveniently the fatty acid components of the vegetable oil to which this mixture is added, is found particularly satisfactory for margarine oils. The monoisopropyl citrate together with its solubilizing agents consisting of the diisopropyl citrate and triisopropyl citrate and the monoglycerides are preferably mixed with a quantity of the oil being treated to form a homogeneous mixture. Since the diisopropyl citrate and triisopropyl citrate are employed as solubilizing agents, these compositions are prepared simultaneously with the monoisopropyl citrate. The mixture of esters is produced as follows:

260 grams of anhydrous citric acid are mixed with 130 grams of commercial isopropyl alcohol, and the mixture is heated at 155° C. for 2 hours in a closed vessel. The pressure developed by the alcohol corresponds to about 55 lbs. per square inch. The alcohol is then evaporated under reduced pressure with a nitrogen stream at 130° C. A typical acid value of the resulting product is 386 and a typical saponification number 702. A typical ratio of free carboxyl to total carboxyl is 0.55.

38 parts of these mixed isopropyl esters of citric acid are dissolved in 44.3 parts of monoglycerides prepared as described in Example 1 together with 17.7 parts of the hydrogenated and deodorized oil to be treated. Preferably 17.7 parts of the oil to be treated are added to the crude monoglycerides after their preparation and before washing. This procedure aids in separation of the wash water and decreases the degree of spontaneous esterification of the free carboxyl groups of the isopropyl citrates by the free hydroxyl groups of the monoglycerides. The water wash, moreover, removes excess glycerin.

10 cc. of the solution of the monoglycerides containing the mixed isopropyl esters are added to 10 kilos of hydrogenated and deodorized vegetable oil containing about 50% soya bean oil and the remainder peanut oil. The oil prior to the addition is heated to a temperature of about 50° C., and during the addition the mixture is agitated.

The procedure outlined in this example has also been found particularly advantageous in the treatment of oil prepared for use as shortening. In that case, 20 cc. of the solution of the mixed isopropyl esters of citric acid are added to 40 kilos of a hydrogenated and deodorized soya bean oil suitable for use as shortening.

Example 3.—To 100 grams of refined, hydrogenated and deodorized soya bean oil is added .025 gram of monoisopropyl citrate prepared by the method described in Example 1. The mixture is preferably heated to approximately 80° C. to effect the relative uniform dispersion of the monoisopropyl citrate throughout the soya bean oil.

Example 4.—5 parts of mixed isopropyl citrates prepared in accordance with the procedure outlined in Example 2 are dissolved in 20 parts of distilled red oil. 25 cc. of this solution are added to 5 kilos of unhydrogenated and undeodorized soya bean oil. During the addition of the solution of the mixed isopropyl citrates, the mixture is agitated vigorously.

Example 5.—Monoisopropyl citrate may be added to soya bean oil and dispersed uniformly therethrough by the use of the corresponding di- and triesters and stearic acid. A mixture for this purpose may be conveniently prepared as follows:

25 parts of mixed isopropyl esters of citric acid prepared as described in Example 2 are heated with 125 parts of commercial stearic acid to above 120° C., with vigorous stirring in an inert atmosphere for ½ hour. The mixture is substantially homogeneous soon after passing 100° C. and remains so down to the solidification temperature of the stearic acid used as one of the coupling agents.

6 cc. of the solution of the mixed isopropyl esters as heretofore described are added to 10 kilos of hydrogenated and deodorized soya bean oil heated to about 50° C. During the addition, the oil is agitated vigorously.

Example 6.—50 grams of the mixed isopropyl citrates described in Example 2 are dissolved in 50 grams of commercial oleyl alcohol. 2 cc. of this mixture are added with agitation to 10 kilos of unhydrogenated soya bean oil.

Example 7.—Other di- and trialiphatic esters of citric acid may be utilized as solubilizing agents for the monoisopropyl citrate. For example, the dioleyl and trioleyl citrates may be employed for this purpose. Since monooleyl citrate also retards the development of rancidity in soya bean oil, the di- and trioleyl citrates are prepared simultaneously with the monooleyl citrate. A composition including monoisopropyl citrate and monooleyl citrate has been found extremely effective in retarding the development of rancidity in soya bean oil. To disperse uniformly these monoaliphatic esters of citric acid throughout the soya bean oil, their corresponding di- and trialiphatic esters are utilized as solubilizing agents. Conveniently, the mono-, di- and triesters are prepared simultaneously as follows:

200 grams of anhydrous citric acid, 25 grams of isopropyl alcohol and 375 grams of oleyl alcohol are placed in a container which is closed to result in the application of pressure during the heating of the reaction mixture. The mixture is heated to 125° C. and maintained at that temperature with stirring for a period of about 10 hours. It is then evaporated under a vacuum, the residue comprising monoisopropyl citrate, diisopropyl citrate, triisopropyl citrate, monooleyl citrate, dioleyl citrate and trioleyl citrate, as well as mixed citric acid esters of isopropyl alcohol and oleyl alcohol.

One gram of these mixed esters is dispersed uniformly with stirring throughout 2 kilos of hydrogenated and deodorized soya bean oil at about 35–50° C.

Example 8.—A composition of hydrogenated and deodorized soya bean oil and monoisopropyl citrate suitable for use for deep fat frying and particularly adapted for the frying of potato chips and doughnuts is prepared by adding to a hydrogenated and deodorized soya bean oil a mixture of monoisopropyl citrate, diisopropyl citrate and triisopropyl citrate in a solution of the monoglycerides of the fatty acid components of the hydrogenated and deodorized soya bean oil to which the mixture is added. The diisopropyl citrate and triisopropyl citrate act as solubilizing agents for the monoisopropyl citrate and the monoglycerides of the fatty acid components of the soya bean oil also aid in the solubilizing of the monoisopropyl citrate. The mixture of monoisopropyl citrate, diisopropyl citrate and triisopropyl citrate for this purpose is prepared as described in Example 2.

The monoglycerides of the fatty acid components of the hydrogenated and deodorized soya bean oil are prepared in the same manner as described in Example 2. 20 cc. of the solution of the mixture of monoisopropyl citrate, diisopropyl citrate and triisopropyl citrate in monoglycerides are added with agitation to 10 kilos of the hydrogenated and deodorized soya bean oil at a temperature of about 50° C. This resulting composition is particularly adapted for deep fat frying and does not develop the rancidity which is manifest in the same hydrogenated and deodorized soya bean oil to which no monoisopropyl citrate is added. It has been found that when potato chips are fried in this composition containing monoisopropyl citrate, and the potato chips stored at 95° F. for a period of about four weeks no undesired taste is manifest in the resulting potato chips, whereas potato chips prepared under identical conditions using the same hydrogenated and deodorized soya bean oil to which no monoisopropyl citrate was added had an unpalatable taste. This comparative testing was performed by four experts skilled in flavor testing.

What is claimed is:

1. A composition of matter comprising a significant amount of a deodorized soya bean oil having incorporated therein, as essentially the sole added anti-oxidant and anti-flavor reversion agent, at least one monoester of citric acid, one of said monoesters present being monoisopropyl citrate.

2. A composition of matter comprising a significant amount of a hydrogenated and deodorized soya bean oil having incorporated therein, as essentially the sole added anti-oxidant and anti-flavor reversion agent, at least one monoester of citric acid, one of said monoesters present being monoisopropyl citrate.

3. A composition of matter comprising a significant amount of a deodorized soya bean oil having incorporated therein a mutual solvent and, as essentially the sole added anti-oxidant and anti-flavor reversion agent in said oil, at least one monoester of citric acid, one of said monoesters present being monoisopropyl citrate, said mutual solvent being capable of dissolving said monoisopropyl citrate and said oil.

4. A composition of matter comprising a significant amount of a hydrogenated and deodorized soya bean oil having incorporated therein a mutual solvent and, as essentially the sole anti-oxidant and anti-flavor reversion agent, at least one monoester of citric acid, one of said monoesters present being monoisopropyl citrate, said mutual solvent being capable of dissolving said monoisopropyl citrate and said oil.

5. A composition of matter comprising a significant amount of a hydrogenated and deodorized soya bean oil having incorporated therein diisopropyl citrate and, as essentially the sole added anti-oxidant and anti-flavor reversion agent, at least one monoester of citric acid, one of said monoesters present being monoisopropyl citrate.

6. A composition of matter comprising a significant amount of a hydrogenated and deodorized soya bean oil having incorporated therein a monoglyceride of a monocarboxylic acid in which the acyl group has at least 10 carbon atoms, and, as essentially the sole added anti-oxidant and anti-flavor reversion agent, at least one monoester of citric acid, one of said monoesters present being monoisopropyl citrate.

7. A composition of matter comprising a significant amount of a hydrogenated and deodorized soya bean oil having incorporated therein a fatty acid having at least 10 carbon atoms and, as essentially the sole added anti-oxidant and anti-flavor reversion agent, at least one monoester of citric acid, one of said monoesters present being monoisopropyl citrate.

8. A composition of matter comprising a significant amount of a hydrogenated and deodorized soya bean oil having incorporated therein stearic acid and, as essentially the sole added anti-oxidant and anti-flavor reversion agent, at least one monoester of citric acid, one of said monoesters present being monoisopropyl citrate.

9. A method of retarding the rancidity of a deodorized soya bean oil which comprises adding thereto, as essentially the sole added anti-oxidant and anti-flavor reversion agent in said oil, at least one monoester of citric acid, one of said monoesters present being monoisopropyl citrate.

10. A method of retarding the rancidity of a hydrogenated and deodorized soya bean oil which comprises adding thereto, as essentially the sole added anti-oxidant and anti-flavor reversion agent, at least one monoester of citric acid, one of said monoesters present being monoisopropyl citrate, said monoisopropyl citrate being dissolved in a mutual solvent for said monoisopropyl citrate and said oil.

11. A method of retarding the rancidity of a hydrogenated and deodorized soya bean oil which comprises adding thereto, as essentially the sole added anti-oxidant and anti-flavor reversion agent, at least one monoester of citric acid, one of said monoesters present being monoisopropyl citrate, said monoisopropyl citrate being dissolved in a monoglyceride of a monocarboxylic acid in which the acyl group has at least 10 carbon atoms.

RALPH H. NEAL.
CHESTER M. GOODING.
HANS W. VAHLTEICH.

REFERENCES CITED

The following references are of record in the file of this patent:

UNITED STATES PATENTS

| Number | Name | Date |
|---|---|---|
| 1,805,458 | Rogers | May 12, 1931 |
| 1,857,274 | Emhardt | May 10, 1932 |
| 2,197,269 | Guillandeu | Apr. 20, 1940 |